US011482744B2

(12) United States Patent
Bhunia et al.

(10) Patent No.: US 11,482,744 B2
(45) Date of Patent: Oct. 25, 2022

(54) MULTI-FUNCTIONAL STRUCTURE FOR THERMAL MANAGEMENT AND PREVENTION OF FAILURE PROPAGATION

(71) Applicant: Teledyne Scientific & Imaging, LLC, Thousand Oaks, CA (US)

(72) Inventors: Avijit Bhunia, Thousand Oaks, CA (US); Steve Q. Cai, Thousand Oaks, CA (US); Olivier Sudre, Thousand Oaks, CA (US); Kyle D. Gould, Los Angeles, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 129 days.

(21) Appl. No.: 15/249,319

(22) Filed: Aug. 26, 2016

(65) Prior Publication Data

US 2017/0047625 A1 Feb. 16, 2017

Related U.S. Application Data

(63) Continuation-in-part of application No. 14/224,963, filed on Mar. 25, 2014.

(51) Int. Cl.
| *H01M 10/6569* | (2014.01) |
| *H01M 10/643* | (2014.01) |
| *H01M 2/20* | (2006.01) |
| *H01M 10/0525* | (2010.01) |
| *H01M 2/10* | (2006.01) |
| *H01M 2/12* | (2006.01) |
| *H01M 10/613* | (2014.01) |

(Continued)

(52) U.S. Cl.
CPC ........ *H01M 10/6569* (2015.04); *F28D 15/04* (2013.01); *F28D 15/046* (2013.01); *H01M 10/0525* (2013.01); *H01M 10/613* (2015.04); *H01M 10/643* (2015.04); *H01M 10/655* (2015.04); *H01M 50/20* (2021.01); *H01M 50/213* (2021.01); *H01M 50/30* (2021.01); *H01M 50/502* (2021.01)

(58) Field of Classification Search
None
See application file for complete search history.

(56) References Cited

U.S. PATENT DOCUMENTS 3,532,158 A * 10/1970 Adoniram ............... E04C 2/365
165/104.26
3,745,048 A 7/1973 Dinkler et al.
(Continued)

FOREIGN PATENT DOCUMENTS

| DE | 102009040067 A1 | 3/2011 |
| JP | 2010211963 A | 9/2010 |

(Continued)

OTHER PUBLICATIONS

Non-Final Office action for U.S. Appl. No. 14/224,963 dated Apr. 26, 2017.

(Continued)

*Primary Examiner* — Zhongqing Wei
(74) *Attorney, Agent, or Firm* — K&L Gates LLP

(57) ABSTRACT

A system for thermal management and structural containment includes a first battery cell having first and second terminal ends, and a first capillary void matrix formed in an outer casing of the first battery cell.

8 Claims, 11 Drawing Sheets

(51) Int. Cl.
*H01M 10/655* (2014.01)
*F28D 15/04* (2006.01)
*H01M 50/20* (2021.01)
*H01M 50/30* (2021.01)
*H01M 50/213* (2021.01)
*H01M 50/502* (2021.01)

(56) References Cited

U.S. PATENT DOCUMENTS

| | | | |
|---|---|---|---|
| 3,815,575 | A | 6/1974 | Danis |
| 3,865,630 | A | 2/1975 | Reimers |
| 4,007,315 | A | 2/1977 | Brinkmann et al. |
| 4,468,440 | A | 8/1984 | Evjen |
| 5,173,378 | A | 12/1992 | Brown et al. |
| 5,985,483 | A | 11/1999 | Verhoog et al. |
| 6,057,050 | A | 5/2000 | Parise |
| 6,106,972 | A | 8/2000 | Kokubo et al. |
| 6,261,716 | B1 | 7/2001 | Hall et al. |
| 6,512,347 | B1 | 1/2003 | Hellmann et al. |
| 6,533,031 | B1 | 3/2003 | Garcia et al. |
| 6,705,418 | B2 | 3/2004 | Wessman |
| 6,840,050 | B2 | 1/2005 | Pode |
| 7,297,438 | B2 | 11/2007 | Kimoto |
| 7,399,551 | B2 | 7/2008 | Yagi et al. |
| 7,795,845 | B2 | 9/2010 | Cho |
| 8,231,996 | B2 | 7/2012 | Howard et al. |
| 8,273,474 | B2 | 9/2012 | Al-Hallaj et al. |
| 8,889,282 | B2 | 11/2014 | Goesmann et al. |
| 2006/0099540 | A1 | 5/2006 | Avelar |
| 2006/0162907 | A1 | 7/2006 | Wu et al. |
| 2006/0213646 | A1 | 9/2006 | Hsu |
| 2007/0151709 | A1 | 7/2007 | Touzov |
| 2007/0267178 | A1 | 11/2007 | Hou et al. |
| 2007/0267180 | A1 | 11/2007 | Asfia et al. |
| 2008/0280192 | A1 | 11/2008 | Drozdz et al. |
| 2008/0299449 | A1 | 12/2008 | Yun et al. |
| 2010/0266885 | A1 | 10/2010 | Lee |
| 2011/0183178 | A1 | 7/2011 | Sohn |
| 2011/0206965 | A1 | 8/2011 | Han et al. |
| 2011/0293982 | A1 | 12/2011 | Martz et al. |
| 2011/0293985 | A1 | 12/2011 | Champion et al. |
| 2012/0055725 | A1 | 3/2012 | Mizoguchi et al. |
| 2012/0107635 | A1 | 5/2012 | Hirsch et al. |
| 2012/0107664 | A1 | 5/2012 | Lee et al. |
| 2012/0114991 | A1* | 5/2012 | Park .............. H01M 2/1077 429/82 |
| 2012/0148881 | A1 | 6/2012 | Quisenberry |
| 2012/0164507 | A1 | 6/2012 | Lachenmeier et al. |
| 2012/0171523 | A1 | 7/2012 | Yang et al. |
| 2015/0280295 | A1 | 10/2015 | Bhunia et al. |
| 2017/0040654 | A1 | 2/2017 | Bhunia et al. |

FOREIGN PATENT DOCUMENTS

| | | |
|---|---|---|
| JP | 2011-007365 A | 1/2011 |
| JP | 2013-161528 A | 8/2013 |
| WO | WO 2004/081686 A2 | 9/2004 |
| WO | 2014176320 A2 | 10/2014 |
| WO | WO-2014176320 A2 * | 10/2014 .......... H01M 2/0267 |

OTHER PUBLICATIONS

International Preliminary Report on Patentability for International Application No. PCT/US2015/049830 dated Mar. 13, 2018.
International Search Report for International Application No. PCT/US2015/049830 dated Feb. 18, 2016.
EPO International Search Report for Serial No. PCT/US2015/049830 dated Feb. 18, 2016.
Wick, n.1, Oxford English Dictionary, 2022, Oxford University Press, 3 pages.
Wick Definition & Meaning, accessed Jul. 7, 2022, Dictionary.com, 4 pages.

* cited by examiner

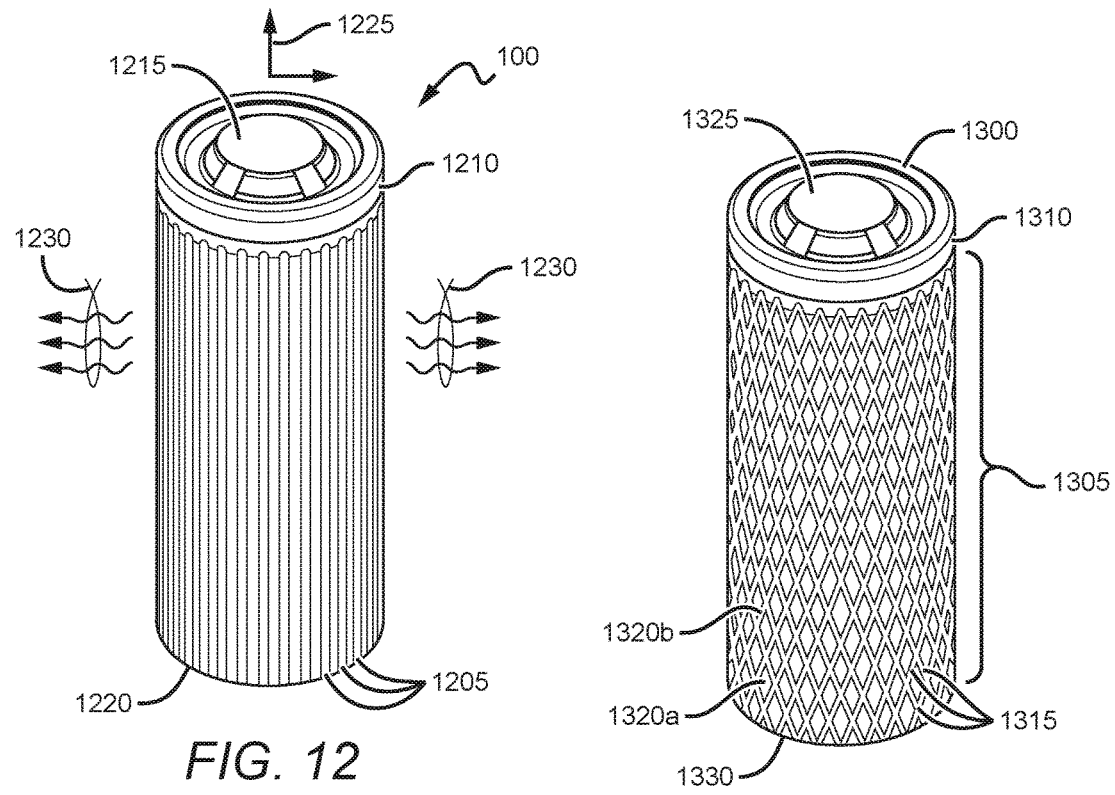
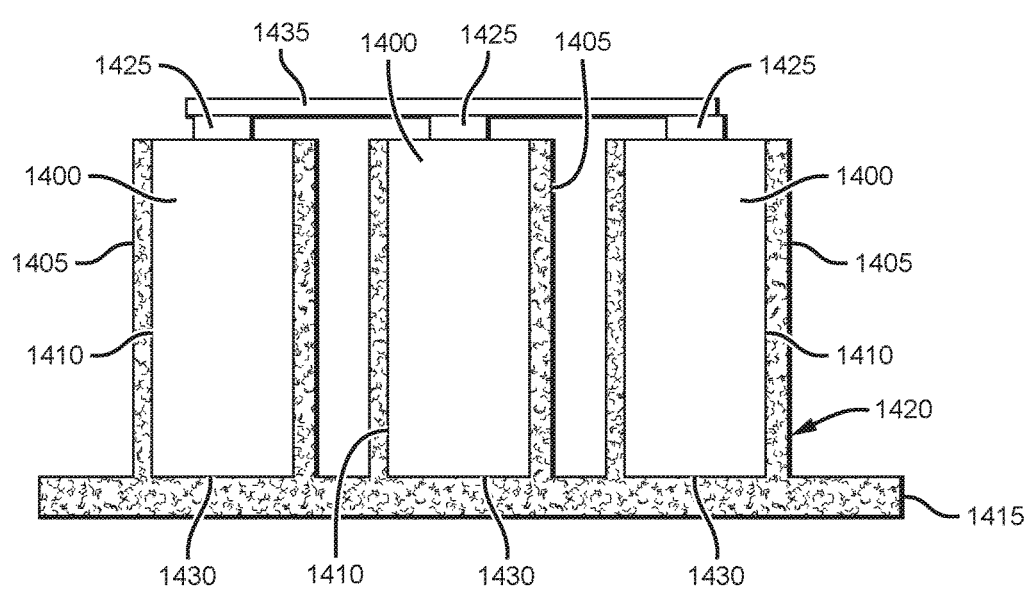

MULTI-FUNCTIONAL STRUCTURE FOR THERMAL MANAGEMENT AND PREVENTION OF FAILURE PROPAGATION

CROSS-REFERENCE TO RELATED APPLICATIONS

This application is a continuation-in-part of and claims priority to Ser. No. 14/224,963, filed Mar. 25, 2014, the disclosure of which is hereby incorporated by reference for all purposes.

BACKGROUND

Field of the Invention

This invention relates to liquid-to-vapor phase-change cooling systems, and more particularly phase-change systems that use a wick.

Description of the Related Art

Li-ion batteries made of an array of cells are subject to lower than desired cycle lifetime, are subject to reliability issues, and may experience catastrophic failure due to excess heat build-up, triggered by a local cell failure and the propagation of the failure to neighboring cells. These concerns may be addressed by providing excess battery capacity to reduce the charge/discharge rate for any particular one cell in the array. The arrays may also be actively cooled to reduce cell case temperature. For example, air or electrically non-conductive liquid may be circulated around the array to transport excess heat away from the array. Alternatively, a solid-to-liquid phase change material may be provided around the array to absorb excess heat in case of a cell failure. Several layers of safety features are generally required to provide fail-safe systems.

A need still exists to provide for improved thermal management and physical safety features for batteries and other heat sources.

SUMMARY

A multi-functional system for thermal management and prevention of failure propagation includes a first battery cell having first and second terminal ends and a first capillary void matrix formed in an outer casing of the first battery cell. The first capillary void matrix may include a plurality of micro-channels disposed in the outer casing, with each of the plurality of microchannels extending between the first and second terminal ends, or may include a lattice of microchannels that are in liquid communication with one another. The first capillary void matrix may also include a wicking ground plane in liquid communication with the first capillary void matrix. In such embodiments, the wicking ground plane may be either a third capillary void matrix in liquid communication with the first capillary void matrix or a pool of working fluid. And electrical bus bar may extend through the wicking ground plane. The apparatus may also include a second capillary void matrix formed in a second outer casing of a second battery cell, the second battery cell having first and second terminal ends, so that the second capillary void matrix is in liquid communication with the first capillary void matrix through the wicking ground plane. In one embodiment, a first vent panel may be opposing the first terminal ends of the first and second battery cells, the first vent panel having a first plurality of vents to transport vapor. The first vent panel may be an electrical bus bar.

Another apparatus may include a plurality of battery cells, each of the plurality of battery cells having a first terminal end and a respective outer casing, each of the plurality of battery cells having a capillary void matrix formed in the respective outer casing, a first panel in connection with the plurality of first terminal ends, and a plurality of vapor vents in the first panel. Each of the plurality of capillary void matrices may include a plurality of microchannels extending from the first terminal end. Each of the plurality of capillary void matrices may include a lattice of microchannels that are in liquid communication with one another, and a wicking ground plane may be in liquid communication with each of the plurality of capillary void matrices. The wicking ground plane may be a capillary void matrix selected from the group consisting of: sintered particles, a working fluid, a wick, and a multiscale wick. In one embodiment, an enclosure may enclose the plurality of battery cells and the first capillary void matrix, the enclosure having a heat exchange surface, and a working fluid may be disposed within the enclosure and in liquid communication with the first capillary void matrix.

Another apparatus may include a cylindrical heat source having an outer cell casing wall and a capillary void matrix formed in the outer casing of the first battery cell. In such an apparatus, the cylindrical heat source may have first and second terminal ends and the capillary void matrix may extend in a straight and contiguous manner on the outer cell casing wall to enable liquid communication between the first and second terminal ends. Alternatively, the capillary void matrix may extend circumferentially about the outer casing of the cylindrical heat source. In further embodiments, the capillary void matrix forms a network of microchannels.

BRIEF DESCRIPTION OF THE DRAWINGS

The components in the figures are not necessarily to scale, emphasis instead being placed upon illustrating the principals of the invention. Like reference numerals designate corresponding parts throughout the different views.

FIG. 12 is a perspective view of a battery cell that has an outer casing formed into parallel microchannels to establish a capillary void matrix;

FIG. 13 is a perspective view of one embodiment of a heat source that has an outer casing formed into a capillary void matrix in the form of a lattice of microchannels;

FIG. 14 is a cross sectional view depicting one embodiment of a plurality of capillary void matrices in communication with each other through a bottom wicking ground plane;

DETAILED DESCRIPTION

A system is disclosed that provides a single unique solution for both thermal management and failure containment of heat sources such as batteries. Under normal operating conditions, the system acts as a liquid-to-vapor phase change thermal management system. Under fault conditions, the system behaves as a firewall and prevents propagation of failure from one heat source, such as a battery cell, to its neighboring component (cell), providing a failure containment system.

Figure 1:
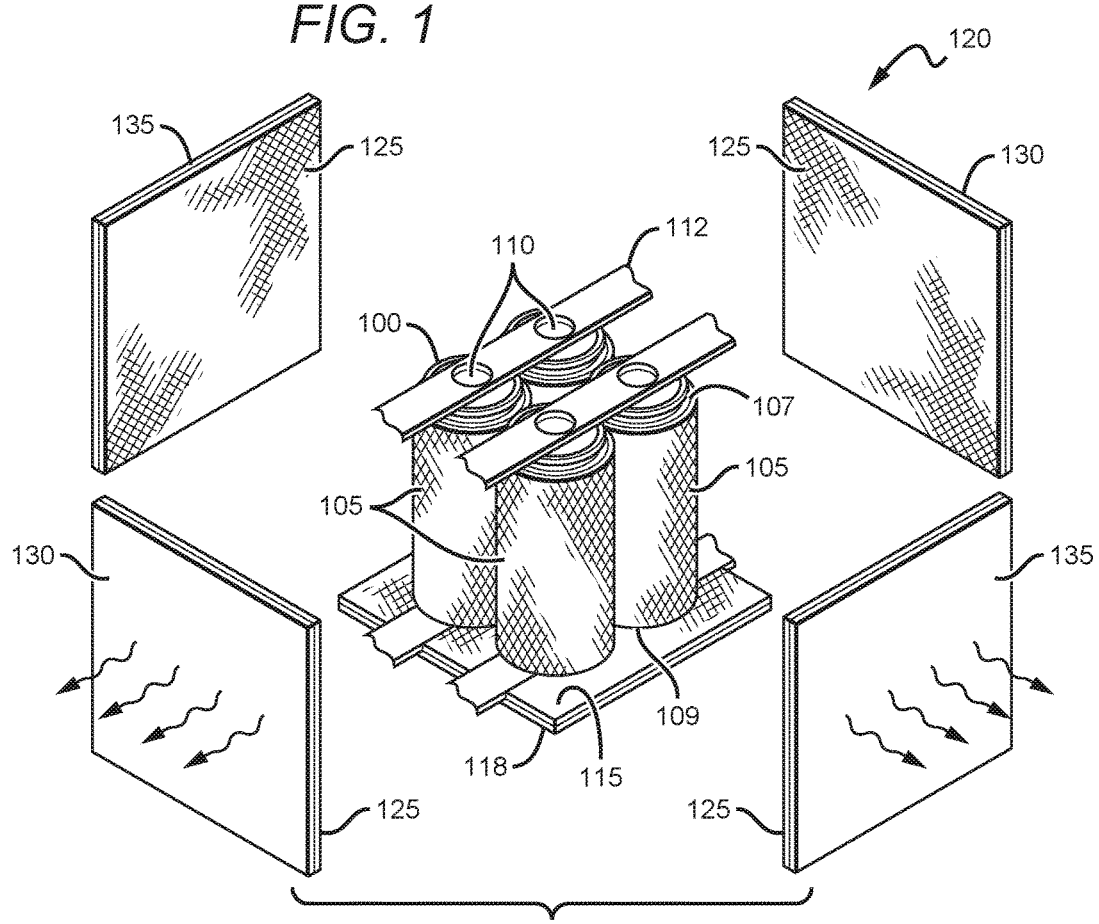
FIG. 1 is an exploded perspective view of the evaporation condensation heat transfer system in an enclosure containing a plurality of heat sources wrapped in respective wicks.

FIG. 1 is an exploded perspective view of a system for thermal management and structural containment of multiple heat sources in an enclosure. A plurality of heat sources, such as heat-generating electrical components or energy storage devices in the form of battery cells ("batteries") 100, each have their surfaces wrapped or otherwise substantially covered in respective wicks 105. A first terminal side 107 of each battery cell 100 is preferably substantially free of wick material to facilitate electrical connection of the top electrical contact 110 onto a conducting lead 112. The battery cells 100 may each be seated on an interior base wick 115 disposed on or attached to a first interior wall 118 of the enclosure 120. The enclosure may be vapor tight or substantially vapor tight to reduce loss of an included working fluid to the atmosphere. In other embodiments the plurality of heat sources may be a single heat source present in the enclosure. Also, although illustrated as cylindrical, the batteries 100 or other heat-generating devices may be square, rectangular or other shape and in physical contact with a wick wrapped about their exterior surfaces to facilitate heat transfer when the wick is charged with a liquid. The wick structure can be designed to provide physical containment of the cell in case of failures. If the battery overheats, the porous layer acts as a firewall shielding the neighboring cells. Ultimately in the case of breaching of the cell walls due to overheating and runaway exothermic reaction, the fibrous jacket provides additional containment.

Interior wick structures 125 may be disposed on pairs of opposing interior walls (130, 135), with each interior wick structure 125 in liquid communication with the interior base wick 115 on the bottom of the enclosure 120 to transport liquid using a wicking action between them. Each wick 105, interior base wick 115, and the interior wick structures 125 are preferably electrically non-conductive and capable of withstanding high temperatures. Although the heat sources are illustrated as seated in a bottom portion of the enclosed heat chamber, the heat sources may be seated on one of the walls of the opposing pairs of interior walls (130, 135) or may span the width or height of the enclosure. The opposing pairs of interior walls (130, 135) may be formed of a heat conducting material such as metal to receive excess heat from the interior wick structure 125. The enclosure 120 may be charged with a working fluid that is preferably a dielectric liquid, such as 3M NOVEC 7200, that has a freeze point of −138° C., boiling point of 76° C. (at 1 atm. pressure) and a critical temperature of ~170° C. thus enabling a typical battery operating range of −40 to +70° C. The saturation pressure may be slightly below 1 atm. when the ambient temperature (outside battery box) is 70° C. In embodiments where the enclosure is not cuboid, such as an enclosure in the form of a sphere or cylinder, "pairs of opposing interior walls" may refer to wall segments on opposite sides of the enclosure from one another.

Figure 2A:
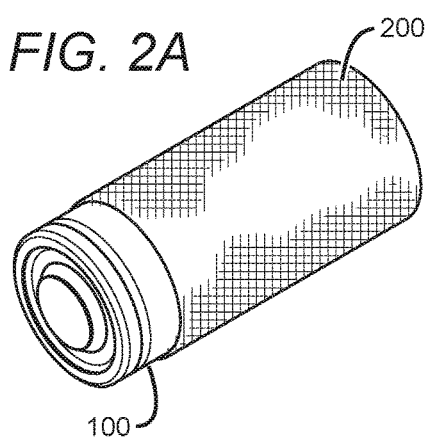
FIGS. 2A and 2B are perspective views of one embodiment of a heat source wrapped in a multiscale wick before and after deformation, respectively.
Figure 2B:
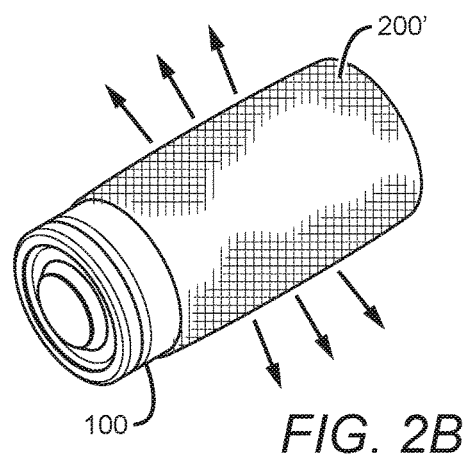

FIGS. 2A and 2B are perspective views of one embodiment of a single heat source that is cylindrical and that has its outer casing substantially encompassed by a wick for use in the enclosure illustrated in FIG. 1. The single heat source may be one of the cylindrical battery cells 100 illustrated in FIG. 1, including, by way of example only, a high-power lithium iron phosphate (LFP) rechargeable battery cell rated at 3.2 nominal volts and 2.6 Ah and configured to charge and discharge at a high current rate, for example, 10 A current at an ambient temperature of 40° C. In alternative embodiments, the single heat source may be a lithium cobalt oxide rechargeable battery or lithium manganese iron phosphate rechargeable battery or other type of rechargeable battery or energy storage device.

In a preferred embodiment, the battery 100 may have a substantial portion of its outer casing encompassed by a multiscale wick 200 that may be formed of high temperature materials such as ceramic (alternatively referred to as a "ceramic jacket" or "ceramic multiscale wick") or glass fibers. As used herein, the phrase "multiscale wick" may refer to a wick structure that has different average pore sizes and distribution to provide multiple effective pore sizes for capillary pumping. Examples of multiscale wicks may include a single-layer wick having fibers of different diameters that are stacked (i.e., more than one fiber deep) or sprayed onto a surface; a plurality of layers of fibers, with each adjacent layer having a different pore size distribution (see FIG. 2C); or one or more layers of braided or knitted fibers. For example, a ceramic multiscale wick may be formed from braided or knitted ceramic fibers or from a nonwoven ceramic process. In one embodiment, the multiscale wick 200 may be formed of a woven structure having a wall thickness of approximately 1 mm. The fiber diameter may be approximately 10 nm to 300 μm and the fiber layer forming the wick may be between 50 microns and 5 mm depending on the type and size of the battery. In other embodiments, the pores may be filled with a matrix (e.g., powders). The fibers may also be treated to improve wetting. One example of a ceramic multiscale wick material is based on the Nextel™ family of fibers sold by 3M™ used for insulation. The woven ceramic multiscale wick 200 provides the dual roles of thermal management and failure containment.

During operation, as used in the enclosure 120 of FIG. 1, excess heat emitted by the battery 100 may induce a liquid-to-vapor phase change of a portion of the liquid in the liquid-filled multiscale wick 200, so that the excess heat is effectively transported away from the battery cell through the liquid-to-vapor phase change and transport of the created vapor away from the battery 100. As best illustrated in FIG. 2B, the high tensile strength of the woven ceramic jacket 200' may also provide supplemental structural reinforcement against radial expansion of the battery to assist pressure containment of the battery 100. The wick may also help to dissipate the heat by evaporative cooling and isolate the neighboring cells from overheating, thereby averting a cascading effect and preventing catastrophic failure.

Figure 2C:
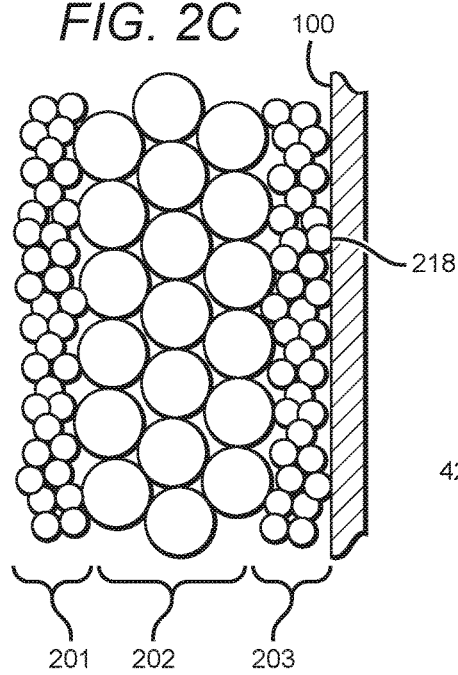
FIG. 2C is a cross sectional view of one embodiment of a multiscale wick.

FIG. 2C shows an example of the multiscale feature of the wick structure. The multiscale wick may have multiple layers, such as 201, 202, and 203. Each layer (201, 202, 203) may have a different pore size and distribution. The finer pore structures 218 are preferably open to vapor space and adjacent to the battery 100.

Figure 3:
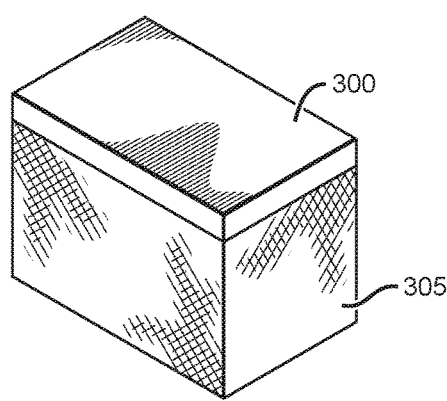
FIG. 3 is a perspective view of a heat source in the form of a rectangular prism that is wrapped in a multiscale wick.

FIG. 3 is a perspective view of a single heat source in prismatic shape such as a rectangular prism that is wrapped in a multiscale wick for use in the enclosure illustrated in FIG. 1. The heat source may be heat generating electronics or a battery 300 encompassed by or wrapped in a jacket 305.

Figure 4A:
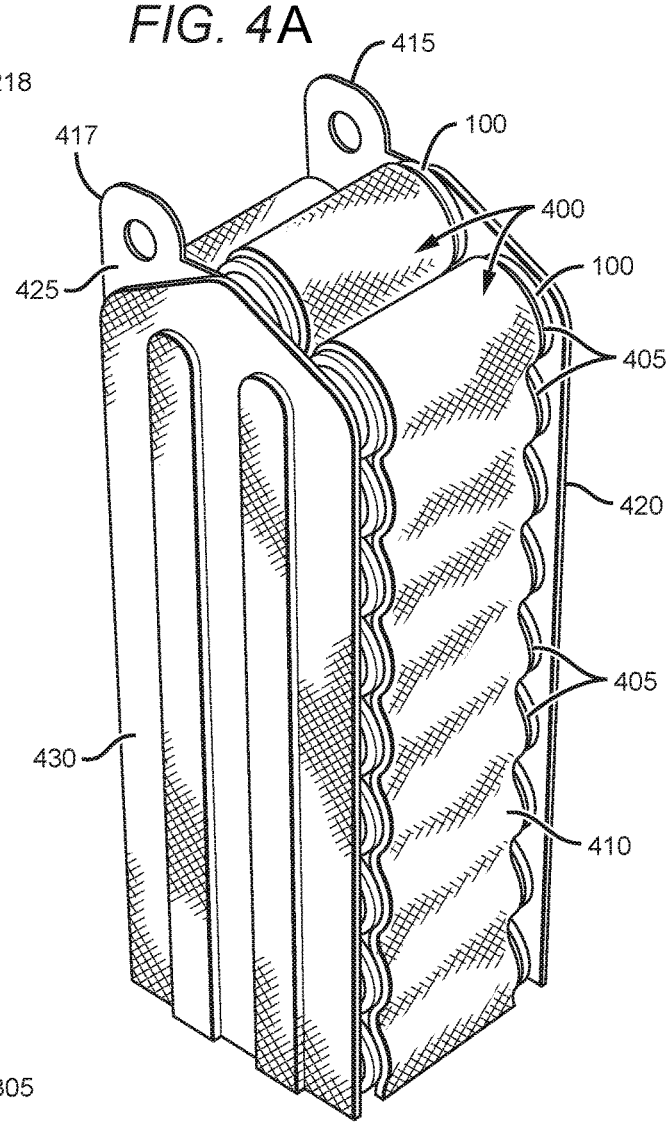
FIG. 4A is a perspective view of one embodiment of a plurality of heat sources stacked in a mono-block configuration, each heat source wrapped in a respective primary jacket and the mono-block wrapped in secondary jacket.

FIG. 4A is a perspective view of one embodiment of a plurality of heat sources, such as cylindrical battery cells, arranged in a mono-block configuration to form an array of batteries for use in an enclosure. As referred to herein, the term "mono-block" means a plurality of heat sources grouped together. Each individual cylindrical battery cell 100 of the mono-block 400 may be substantially encompassed or wrapped by a multiscale wick that may be a woven wick (alternatively referred to as a "primary jacket") 405. The primary jacket 405 may have a wall thickness of approximately 1 mm. In an alternative embodiment, the primary jacket may be a wick that is not a multiscale wick. A secondary multiscale wick that may be a woven wick (alternatively referred to as a "secondary jacket") 410 may encompass or wrap the primary jackets 405 of the mono-block 400. In alternative embodiments, either or both of the primary and secondary jackets (405, 410) may be formed of braided or knitted fibers or from a nonwoven process. Either of the primary or second jackets may be formed from ceramic, glass, or from high-temperature synthetic fibers such as aramid. The primary and secondary jackets (405, 410) are in liquid communication with one another so liquid may be transported between them. The mono-block 400 may be formed by a plurality of stacked columns, or a single stacked column, and may be axially supported by complementary panels (415, 417) that are spaced apart at a distance that approximates the length of the batteries 100 to facilitate electrical connection of battery terminals at the complementary panels (415, 417). The secondary jacket 410 may provide at least partial support for the batteries 100 so that they do not fall out of the mono-block 400. Each of the complementary panels (415, 417) may have their external surfaces (420, 425) covered with a wick that may be a multiscale wicking layer 430. In FIG. 4A, the mono-block encompasses twenty-four battery cells. During normal operation, the primary and secondary cell jackets (405, 410) provide strong capillary force to pull dielectric liquid towards an outer casing of each of the plurality of cells 100 as other portions of the dielectric liquid evaporate at the battery due to absorption of excess heat from the batteries 100.

Figure 5:
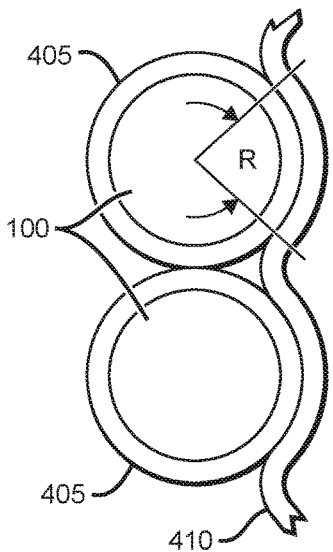
FIG. 5 is a cutaway view illustrating two battery cells wrapped in respective first multiscale wicks with a second multiscale wick extending along and partially conforming to exterior surfaces of the first multiscale wicks.

Liquid communication between and among the primary jackets 405 is enhanced by liquid communication along the secondary jacket 410. Conforming the secondary jacket 410 shape to the shape of each primary jacket 405 may enhance such liquid communication. For example and as illustrated in FIG. 5, rather than forming the secondary jacket in a plane having flat exterior surfaces, the secondary jacket 410 may extend along a partial radius R of each respective woven ceramic jacket 405 that encompasses the outer cylindrical surface of each battery cell 100. (See FIG. 5). Other arrangements including integrally woven joint tubes and multilayer fabrics can be devised as a single jacket serving both roles. In another embodiment, the secondary jacket may be omitted, with liquid being transported directly from the interior base wick 115 to the primary jacket (see FIG. 1) or from a liquid store (not shown) in liquid communication with the primary jacket. In further embodiments, the primary jacket 405 be functionally replaced with a plurality of capillary void matrices formed in an outer casing of the battery 100 (see FIGS. 12 and 13), with the secondary jacket 410 extending along a partial radius R of the outer cylindrical surface (i.e., casing) of each battery cell 100.

In an alternative use of the mono-block 400, the primary and secondary jackets (405, 410) may receive heat energy in the form of vapor from locations removed from the mono-block 400. The vapor may condense on the secondary jacket 410, and/or through the secondary jacket 410 to the primary jacket 405, for communication of the condensed liquid by wicking action to the batteries 100. In this manner, the batteries may receive excess heat energy through the primary and secondary jackets (405, 410) rather than expelling excess heat energy from the batteries 100 as described above. This method may be useful for warming batteries 100 for use in climates that would otherwise be too cold for ideal operation at startup. As the batteries 100 are used and begin to generate their own excess heat, the transfer of heat energy between the batteries 100 and locations removed from the mono-block may be reversed, with vapor created on the outer casing of the batteries 100.

Figure 4B:
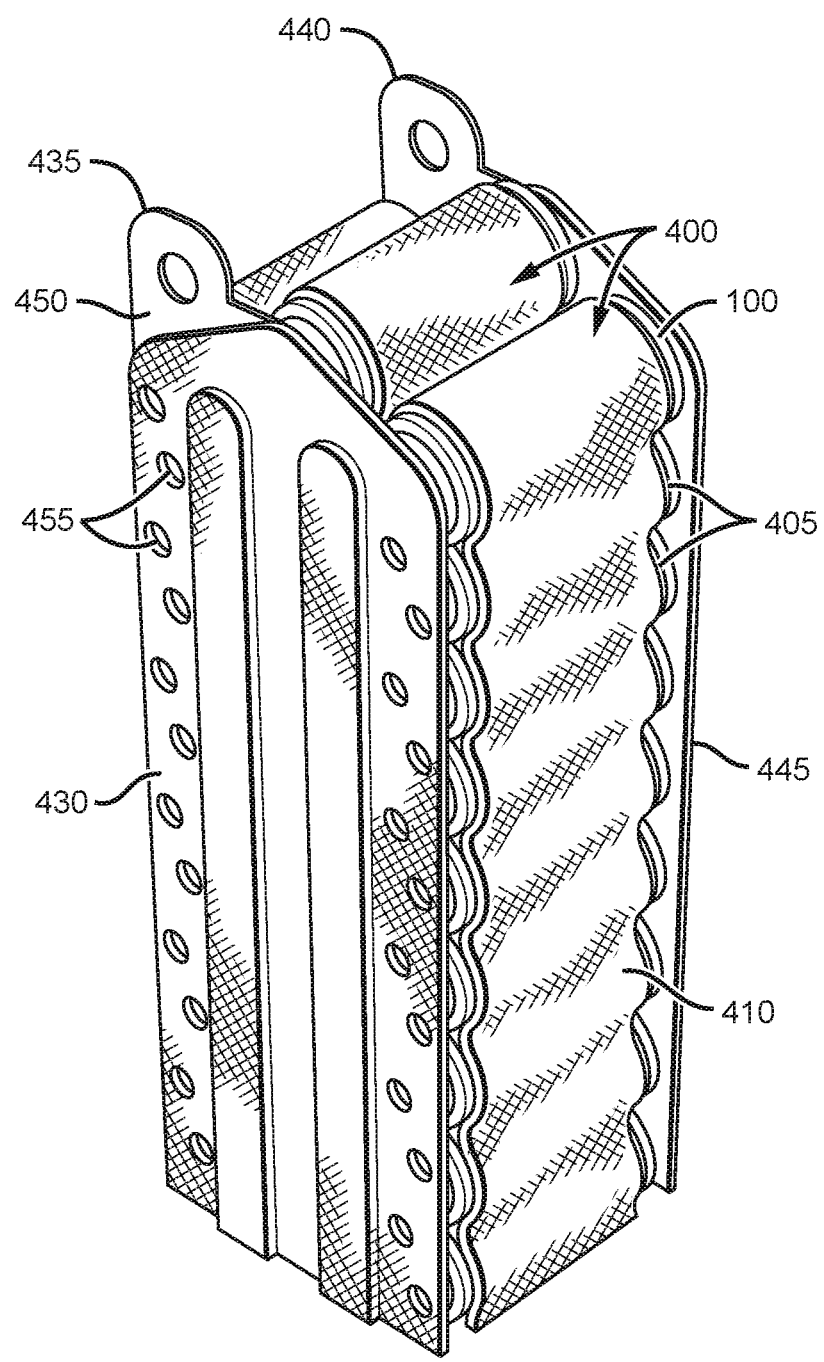
FIG. 4B is a perspective view of one embodiment of a plurality of cylindrical battery cells stacked in a mono-block configuration in an enclosure that has vents to receive and transport vapor away from the batteries.

FIG. 4B is a perspective view of one embodiment of a plurality of cylindrical battery cells stacked in a mono-block configuration in an enclosure that has vents to receive and transport vapor away from the batteries. As illustrated in FIG. 4A, each individual cylindrical battery cell 100 of the mono-block 400 may be substantially encompassed or wrapped by a primary jacket that is a capillary void matrix. As used herein, "capillary void matrix" is a structure having a plurality of voids that provide capillary pumping action when a working fluid is introduced therein (alternatively referred to as a "wick"). Such voids may be of any shape, including voids created as between adjacent particles, columnar voids established in capillary tubes, columnar voids established in microchannels, or patterns of segmented channels. For example, the capillary void matrix may be a woven ceramic wick. The secondary jacket 410 may encompass or wrap the primary jackets 405 of the mono-block 400. The primary and secondary jackets (405, 410) may be in liquid communication with one another so liquid may be communicated between them. The mono-block 400 may be formed by a plurality of stacked columns, or a single stacked column, and may be axially supported by complementary panels (435, 440) that are spaced apart at a distance that approximates the length of the batteries 100 to facilitate electrical connection of battery terminals at the complementary panels (435, 440). Each of the complementary panels (435, 440) may have their external surfaces (445, 450) covered with a wick that may be a multiscale wicking layer 430. In addition, each of the complementary panels may have a plurality of vents 455 extending through the complementary panels (435, 440). Such vents 455 may be used to facilitate transport of excess heat produced by the cells 100 in the form of vapor, from a position adjacent the batteries 100 to a position removed from the cells.

Figure 6A:
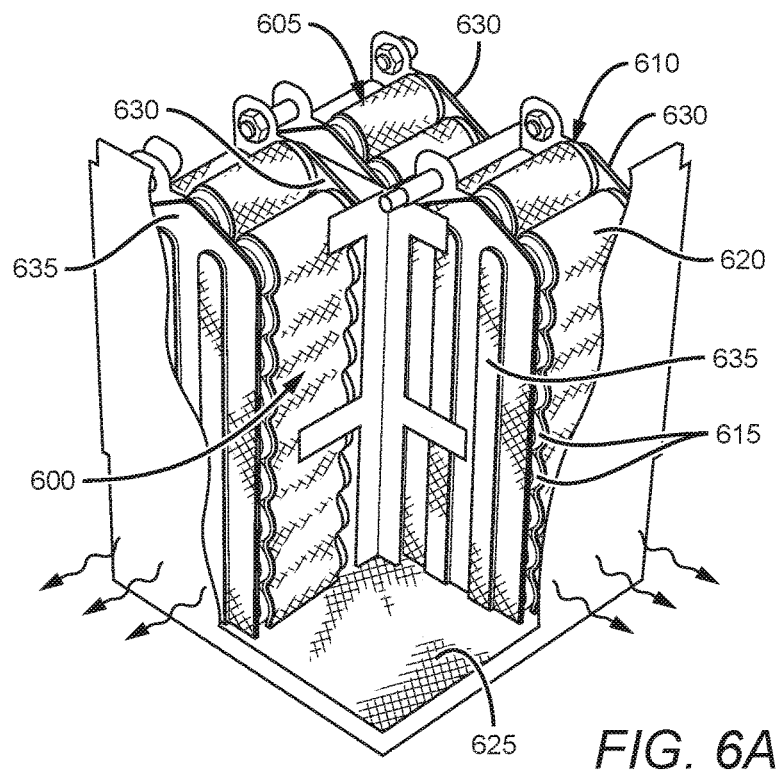
FIG. 6A is a perspective view of a plurality of mono-blocks seated in the the enclosure.

FIG. 6A is a perspective cut-away view of a plurality of heat sources arranged in several mono-blocks in an enclosure. Each mono-block (600, 605, 610) is illustrated as consisting of cylindrical battery cells 100, although other heat sources may be used. Each mono-block (600, 605, 610) may have an identical number of columns and batteries 100, or each mono-block may have a unique combination of columns, batteries and heat source types. For example, each column in each mono-block may consist of a single battery or a plurality of batteries. Each battery 100 has a substantial portion of its outer cylindrical surface individually encompassed by or wrapped in a primary jacket 615. A secondary jacket 620 or multiple secondary jackets may wrap around an exterior of the primary jackets 615 of each mono-block to provide liquid communication between and among the batteries 100 of each respective mono-block (600, 605, 610). The secondary jacket 620 of each mono-block may wrap around and under the mono-block so that a portion of the secondary jacket is sandwiched between the mono-block and a battery base multiscale wick 625. When the battery base multiscale wick 625 is charged with a reserve liquid, such as a dielectric liquid, the dielectric liquid may be drawn up from the battery base multiscale wick 625 into the secondary jacket 620 for further distribution between and among the primary jackets 615 in each of the mono-blocks (600, 605, 610). The wick structures are designed to avoid interference with electrical connections.

Each mono-block has complementary panels (630, 635) spaced apart at a distance that approximates the length of the batteries 100 to facilitate electrical connection between battery terminals on the batteries and terminals on the complementary panels (630, 635). Through suitable electrical connection between the complementary panels, positive terminals of a first mono-block may be connected to negative terminals of a second mono-block for suitable electrical configuration.

Figure 6B:
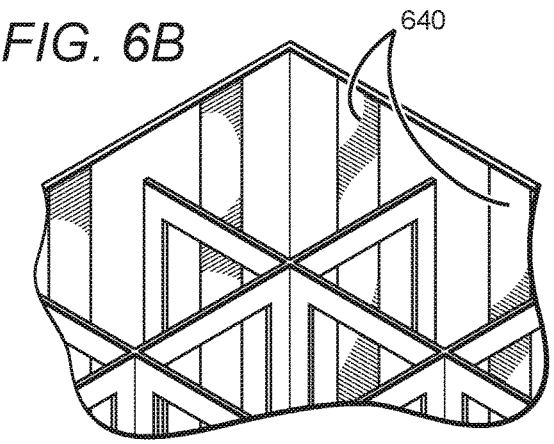
FIG. 6B is a perspective view of one interior corner of the enclosure illustrated in FIG. 6A.

FIG. 6B is a close-up perspective view of one interior corner of the enclosure. A plurality of multiscale wicks 640 extend along an interior surface of the interior walls of the enclosure. Such wicks may be used for condensation, evaporation and fluid transport. In one embodiment, the multiscale wicks 640 enable gravity-independent operation by enabling liquid to wick regardless of the gravitational orientation of the enclosure.

Figure 7:
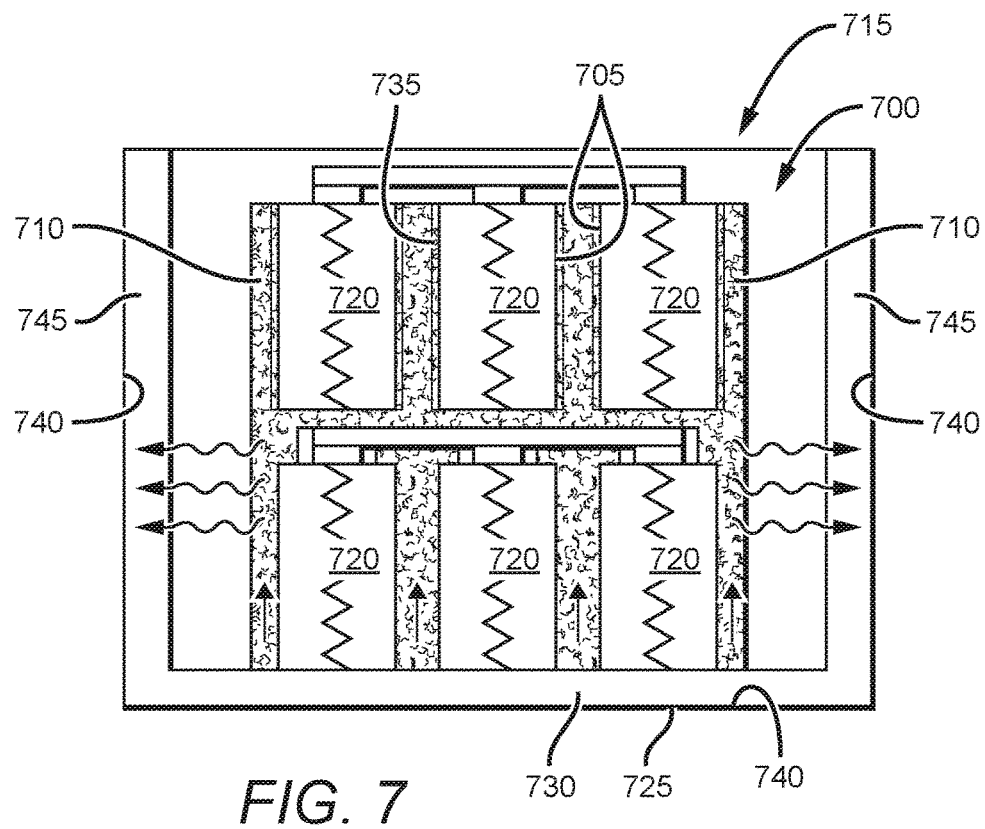
FIG. 7 illustrates operational flow of vapor and liquid in the enclosure containing a plurality of heat sources.

FIG. 7 is a sectional view of a multi-cell battery array 700 having primary and secondary jackets (705, 710) and enclosed in an enclosure that is a battery box 715 to illustrate operation. Each cell 720 is surrounded by respective primary cell jackets 705 that may each be formed of a porous woven structure having a wall thickness of approximately 1 mm. The array of parallel cells 720, forming a mono-block of a larger battery system, is also surrounded by a porous wick structure, called the secondary cell jacket 710. The primary and secondary porous structures (705, 710) may be physically connected to each other to enable liquid communication between them. The open space around the cells and blocks of cells allow rapid vapor transport. A bottom wall 725 of the battery array is also covered with a thin porous layer 730. Under normal operating condition of cell discharge and charge, the primary and secondary cell jackets (705, 710) act as a wick, pulling the dielectric liquid from the bottom of the battery box to an exterior surface 735 of each cell (i.e., the cell casing) by capillary action. The liquid near the cell wall vaporizes after absorbing the heat generated inside the cell 720. The vapor condenses on inner walls 740 of the battery box 715. The condensate accumulates at the bottom, by gravitational force or by capillary force of similar porous structures 745 implemented on the inner walls 740 of the battery box 715 (in case gravity independence is desired). The phase change and liquid/vapor circulation continues to transfer heat from the cell walls 735 to the battery wall 740, from where it is rejected into the ambient. Fundamentally the concept of operation is an evaporation condensation heat transfer system in an enclosure, a passive 3-D heat spreading and heat dissipation technology.

In further embodiments, an enclosure may enclose the battery cell and the first capillary void matrix, the enclosure having a heat exchange surface, and a working fluid disposed within the enclosure and in liquid communication with first capillary void matrix. The heat exchange surface may include a plurality of fins extending from an exterior side of the enclosure. The heat exchange surface may also include a plurality of fins extending from an interior side of the enclosure. Additionally, a pressure relief valve (not shown) may be provided through one of battery box 715 walls to enable venting of gas if a predetermined maximum internal pressure is exceeded. The pressure relief valve (not shown) may be provided with a steam trap to minimize loss of working fluid during such venting. An optional service valve (not shown) may also be provided to enable periodic maintenance such as evacuating the system of built up non-condensable gases and for replenishment of lost working fluid.

Cooling capability in excess of 100 W/cm2 can be achieved by designing the multiscale pores (10 nm to 1 mm) of the primary and secondary cell jackets (705, 710). The cooling capability may far exceed the typical power dissipation density of a cell 720 even under the most severe discharge rate condition of 30 C (i.e., 30 times faster than the rated capacity of the cell or battery). Due to the connected vapor space within the battery case 700 and the identical vapor saturation temperature, a nearly isothermal condition can be achieved among cells 720 inside a large battery module. A small overpressure gas release valve may be added for safety.

Dielectric liquid, such as 3M NOVEC 7200 has a freeze point of −138° C., boiling point of 76° C. (at 1 atm. pressure) and a critical temperature of ~170° C. Thus it is suitable for the entire ambient temperature range under which the battery 700 may operate (−40 to +70° C.). The saturation pressure is slightly below 1 atm. when the ambient temperature (outside the battery box 715) is 70° C. The small pressure differential eases the strength and thickness requirements of the battery box wall 725, resulting in a lightweight battery with effective heat conduction through the wall 725. The battery preferably sealed to accomplish the operation described above, similar to current lead acid batteries. A gas release valve can provide a vapor escape path in case of overpressure if the system is overheated.

Figure 8:
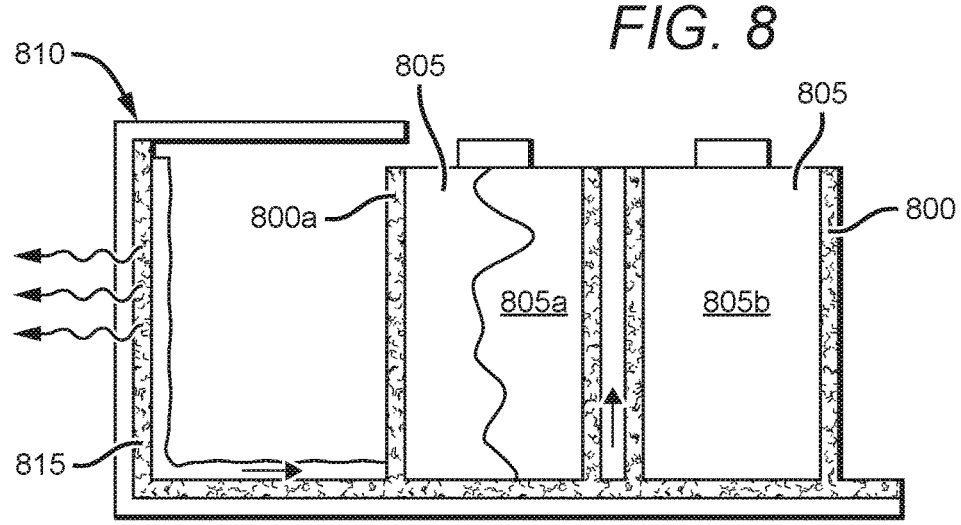
FIG. 8 illustrates use of a multiscale wick wrapped around a failed heat source for thermal isolation.

FIG. 8 illustrates the features of thermal management and physical safety in a system having a plurality of heat sources in physical contact with respective multiscale wicks ("primary jackets") wrapped about their exterior surfaces. During operation, there is preferably a continuity of liquid supply saturating the primary jackets (800, 800*a*) of each of the cells 805 in the battery 810, which are physically connected. Thus, when a single cell 805*a* overheats due to a local failure, the cooling mechanism represented by its primary jacket 800*a* and available liquid supply first auto-regulates to bring more liquid from the secondary jackets (not shown), interior wick structures 815, and from the surrounding cells (liquid quenching). Thus heat generated in a failed cell 805*a* is dissipated through liquid-to-vapor phase change, rather than being dumped into its neighboring cell. If the limit of this self-adaptive liquid quenching mechanism is reached for the single cell 805*a*, its respective primary jacket 800*a* starts to dry up and, as its temperature rises, the respective primary jacket 800*a* rapidly becomes an insulator, shielding neighboring cells 805*b* from the local heat. Finally, in case of a cell failure and rupture of the single cell 805*a*, the woven structure of the primary jacket 800*a* acts not only as a firewall due to its capability of withstanding high temperature but also as a physical containment due to the strength of the woven fiber. The deformation and strength of the primary jacket 800*a* depends on a number of parameters, such as the type of fiber and the weave architecture.

Figure 9:
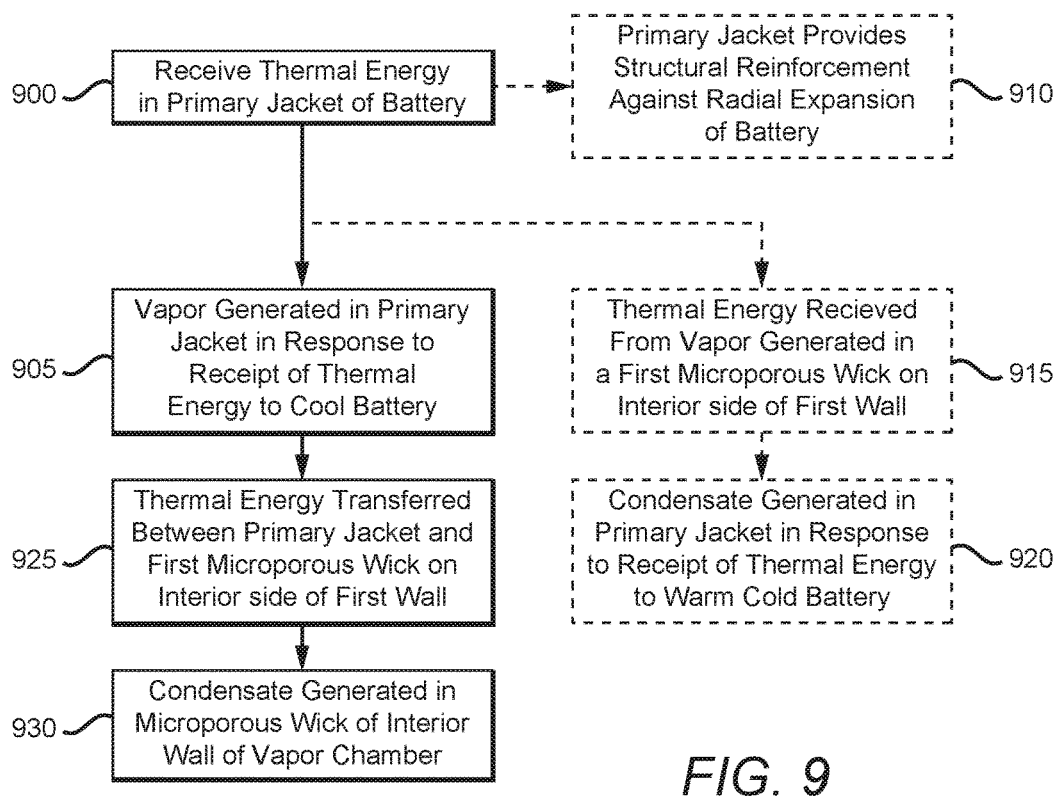
FIG. 9 is a flow diagram illustrating one embodiment of thermal management of a heat source wrapped in a multiscale wick in the enclosure.

FIG. 9 is a flow diagram illustrating one embodiment of a method for "forward" and "reverse" operation of a system for thermal management and structural containment of a multiscale wick-wrapped battery enclosed in an enclosure. Thermal energy may be received in a primary jacket of a battery (block 900). In one embodiment described for convenience as "forward operation," vapor is generated in the primary jacket in response to receipt of the thermal energy that may be excess thermal energy received from the battery (block 905). The liquid-to-vapor phase change in the primary jacket serves to draw out excess thermal energy from of the battery. In one embodiment of the method of thermal management and structural containment when excess heat build-up in the battery causes radial expansion and/or containment failure of the battery, the primary jacket may provide structural reinforcement against expansion (block 910) regardless of the availability of liquid in the primary jacket.

In another embodiment described for convenience as "reverse operation," thermal energy is received in the primary jacket of the battery by means of vapor generated in a first multiscale wick on an interior side of a first wall of the enclosure (block 915). The vapor in the first multiscale wick may be created from a liquid-to-vapor phase change prompted by thermal energy received from a heat source exterior to the enclosure or from a heat source mounted to an exterior of the enclosure for communication to the primary jacket. In one embodiment, the heat source is a heater blanket. The vapor-to-liquid phase change in the primary jacket (block 920) serves to warm the battery for its use in environments that would otherwise be too cold for ideal operation of the battery at startup. In this "reverse operation" mode, working fluid in the suspended form of vapor is in communication with the primary jacket for the vapor-to-liquid phase change heat transfer operation.

In forward operation, the vapor generated in the primary jacket (block 905) is transferred to the first multiscale wick on the interior side of the first wall of the enclosure (block 925). The vapor may undergo a vapor-to-liquid phase change as it is cooled by the first multiscale wick to form condensate (block 930) to finally draw the excess heat energy away from the battery. The condensate may then be wicked or otherwise transported back to the primary jacket for receipt of additional thermal energy to accomplish a liquid-to-vapor phase change for transport of excess heat energy from the battery back to the first multiscale wick for transport of the thermal energy out of the enclosure.

EXAMPLES

Example 1

Figure 10:
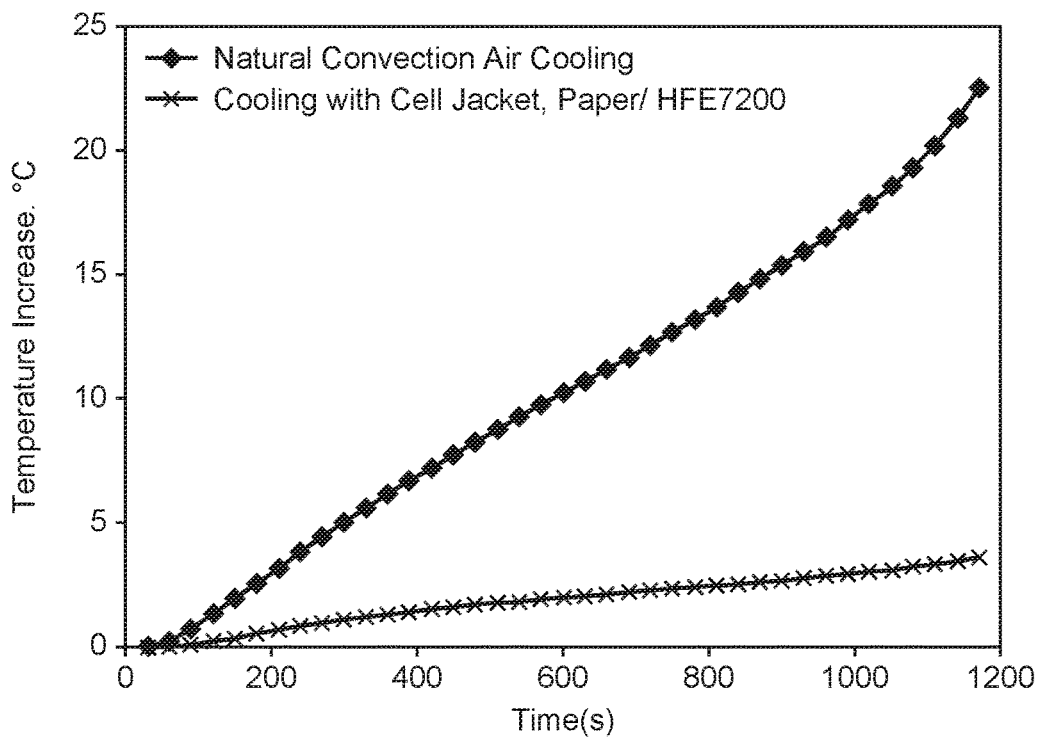
FIG. 10 is a graph illustrating Li-ion cell temperature vs. time during rapid discharge, first with one embodiment of a liquid-charged porous wick wrapped around the cell and then without the porous wick wrapped around the cell.

A rechargeable lithium iron phosphate (LFP) battery, cylindrical in shape with nominal dimensions 26 mm in diameter and 65 mm in height (26650 LFP) is placed inside a vapor-tight enclosure. Electrical leads are connected to the cell using feedthroughs in the cover of the enclosure. Certain amount of dielectric liquid 3M NOVEC 7200 is placed at the bottom of the enclosure. The battery is first charged at 0.5 C rate to 3.65 V and then further charged at constant voltage with the current decreasing over time down to 65 mA. The battery is then discharged fully to 0% SOC under a constant resistance load, starting with 10 Amp current. The temperature of the cell is recorded as a function of time during the discharge. The ambient temperature around the enclosure is kept at 40° C. The temperature of the cell wall is rising as shown in FIG. 10 by 23° C. at 0% SOC.

Example 2

A cylindrical rechargeable 26650 LFP cell (26650) is covered using 250 microns thick non-woven porous structure on the cylindrical cell wall and placed inside a vapor-tight enclosure. The charge and discharge process of example 1 is repeated. The temperature rise during the discharge is shown in FIG. 10. The effect of the evaporation-condensation process inside the chamber reduces the temperature increase to only 3° C.

Example 3

Figure 11:
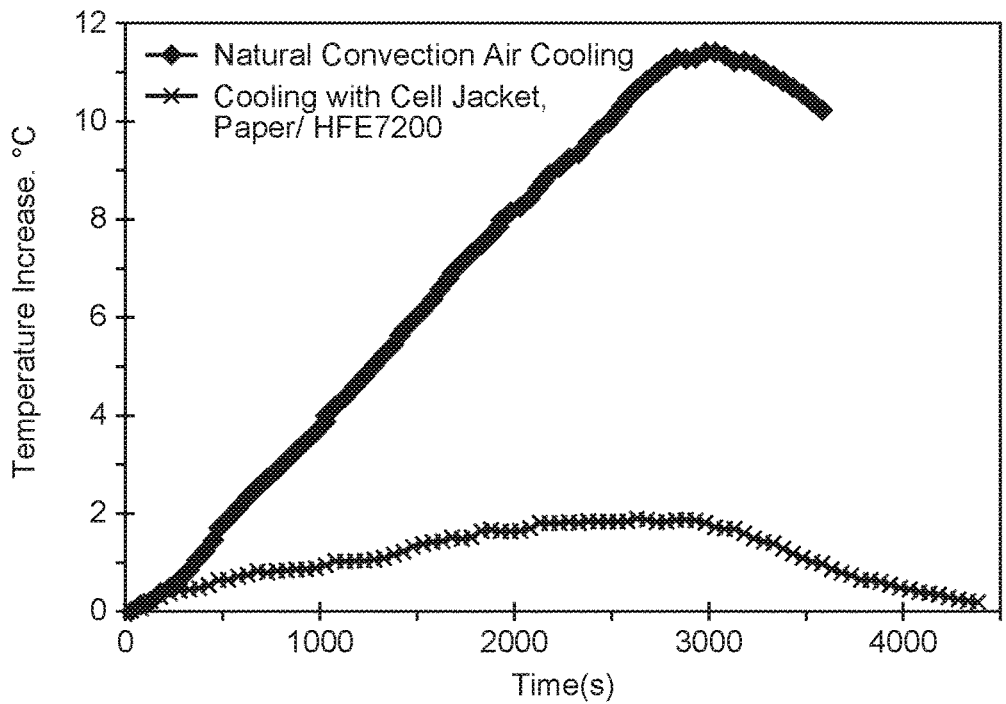
FIG. 11 is a graph illustrating Li-ion cell temperature vs. time during rapid charge, first with one embodiment of a liquid-charged porous wick wrapped around the cell and then without the porous wick wrapped around the cell.

The experiment in example 1 is repeated except that the charge is carried at a constant current (CC) 4 Amp (1.5 C) charge until cell voltage reaches 3.65 V (approximately at ~3000 s), and then constant voltage charge until current trickles down 65 mA. The ambient temperature is 60° C. The temperature of the cell is recorded as a function of time during the charge and the temperature peaks just after the constant current step at 11° C., as shown in FIG. 11.

Example 4

The cell is covered with a non-woven porous structure as in example 2 and the charge procedure of example 3 is followed. In this example, the temperature increase of the cell peaks at ~2° C. (FIG. 11) demonstrating the dramatic effect of the cooling process provided by the addition of the porous wick.

FIG. 12 is a perspective view of one embodiment of a heat source that has an outer surface of its cell casing wall formed into parallel microchannels to establish a capillary void matrix. In FIG. 12, the cylindrical battery cell 100 described in furtherance of FIG. 1 has been provided with a modified outer casing 1200 having a plurality of spaced apart and parallel microchannels 1205. The microchannels 1205 may be formed in the outer surface 1210 of the outer casing 1200 using, for example, additive manufacturing techniques, die casting or machining. Each of the microchannels 1205 may extend from one terminal end 1215 to the other terminal end 1220 in a straight and contiguous manner on the outer casing 1200 such that when a working fluid is introduced to charge the microchannels 1205, such as with the dielectric fluids described herein, capillary pumping action in the microchannels 1205 induce the working fluid to extend across a substantial portion of the outer casing 1200 of the cylindrical battery cell 100 but for the terminal ends (1215, 1220). The microchannels 1205 may each be discreet from one another, with the only liquid communication between them existing at terminal ends (1215, 1220) of the microchannels 1205, or a plurality of inter-microchannels (not shown) may provide liquid communication between adjacent microchannels 1205.

Although the microchannels 1205 are illustrated as each running parallel to one another and longitudinally along the battery cell 100, in another embodiment, the microchannels 1205 are collectively formed at an angle from the battery's longitudinal axis 1225 so as to wind slightly about the battery cell 100 as they extend from one terminal end to the other terminal end. In a further embodiment, the microchannels 1205 may run circumferentially about the cylindrical battery, rather than longitudinally, such as may be the case if the battery is laying on its side in a pool of working fluid (one example of a "thermal plane"), packed against and in thermal communication with another battery from which it may receive the working fluid, or if the working fluid is to be received by the microchannels 1205 during operation from a working fluid source existing other than at the battery's terminal ends (1215, 1220). In a further embodiment, each longitudinally extending microchannel has a discontinuity thus requiring capillary pumping from either end of the battery in order to completely cover the outer casing of the battery cell 100. The outer casing 1200 is preferably capable of withstanding high temperatures.

During operation and focusing on a single microchannel 1205, excess heat transmitted to the outer casing 1200 from an interior of the battery cell 100 may induce a liquid-to-vapor phase change of a portion of the liquid in the microchannel 1205, so that the excess heat is effectively transported away from the battery cell through the liquid-to-vapor phase change and transport of the created vapor 1230 away from the battery cell 100. Replacement working fluid may be available from other portions of the microchannel for capillary pumping action to replace the fluid that was transported away during the liquid-to-vapor phase change. Any gaps in fluid coverage within the microchannel 1205, whether as a result of localized liquid-to-vapor phase change or from forced mechanical transport (such as may occur during temporal and excessive G-force loads), may be replaced using the passive capillary pump action of adjacent working fluid within the microchannel 1205, capillary pull as fluid is evaporated and/or capillary percolation to introduce new working fluid into the microchannel 1205.

FIG. 13 is a perspective view of one embodiment of a heat source that has an outer surface of its cell casing wall formed into a capillary void matrix in the form of a lattice of microchannels. In FIG. 13, the cylindrical battery cell 100 described in furtherance of FIG. 1 has been provided with a modified outer casing 1300 having a lattice of microchannels 1305 formed in the outer surface 1310 of the outer casing 1300 using, for example, additive manufacturing techniques, die casting or machining. The lattice 1305 consists of a network of microchannels (alternatively referred to as "microchannel segments" 1315) with adjacent microchannel segments 1315 in liquid communication with one another so that working fluid introduced into one microchannel segment 1315 is induced to continue to one or more adjacent microchannel segments 1315 through capillary pumping action, assuming adequate liquid charge supply. As the working fluid moves from adjacent microchannel segment 1320$a$ to adjacent microchannel segment 1320$b$ (for example), the entire lattice 1305 of microchannel segments 1315 is charged with the working fluid. Although the lattice of microchannels 1305 illustrated in FIG. 13 appears to form a diamond-pattern lattice structure, the lattice of microchannels 1305 may form other repeating or non-repeating patterns of microchannel segments 1315 that extend substantially over the battery cell casing 1300, but for the terminal ends (1325, 1330).

In an alternative embodiment, the terminal ends (1325, 1330) may also be provided with microchannels or other capillary void matrix structures or one or more of the terminal ends may be provide with a wicking ground plane for receipt of replacement working fluid for the lattice of microchannels. In such an embodiment, the terminal ends (1325, 1330) may also be provided with working fluid for a cooling capability.

FIG. 14 is a cross sectional view depicting one embodiment of a plurality of capillary void matrices in communication with each other through a bottom thermal/material ground plane. A plurality of heat sources 1400 are seated in respective capillary void matrices that may be respective wicking jackets 1405. An outer casing 1410 of each heat source may be in direct liquid communication with its respective wicking jacket 1405. Each wicking jacket 1405 may be in liquid communication with the remainder of the wicking jackets 1405 through a thermal/material ground plane 1415 coupled between them. In one embodiment, the ground plane 1415 could be a wicking structure. The structure 1415 and wicking jackets 1405 are formed from the same wicking substrate 1420. In one example, the wicking ground plane 1415 and wicking jackets 1405 may be a substrate of sintered particles, such as copper (Cu) sintered particles, formed in a common mold prior to sintering and subsequent assembly with the heat sources 1400. In another embodiment, the wicking ground plane 1415 and/or wicking jackets 1405 may consist of separate subassemblies that are joined during manufacturing to form a homogenous wicking apparatus that allows liquid communication between and among the various wicking jackets 1405. In one embodiment, each of the heat sources 1400 are cylindrical battery cells having first and second terminal ends (1425, 1430). First terminal ends 1425 may be electrically joined through an electrical bus 1435.

Although the wicking jackets 1405 are illustrated as spaced apart from one another, they may be positioned directly adjacent to one another so that each wicking jacket 1405 is in direct liquid communication with its adjacent wicking jacket 1405. In such configurations, the single thermal wicking plane may be defined as the common wicking structures themselves and/or the bottom wicking layer because all collectively provide parallel liquid flow paths around each battery cell and allow for thermal and liquid mass communication throughout the entire array of battery cells. In other embodiments, a portion of the first terminal ends may also have a capillary void matrix layer for receipt of working fluid. In such embodiments, an electrical connection may extend up through the capillary void matrix for electrical coupling with adjacent first terminal ends.

Figure 15:
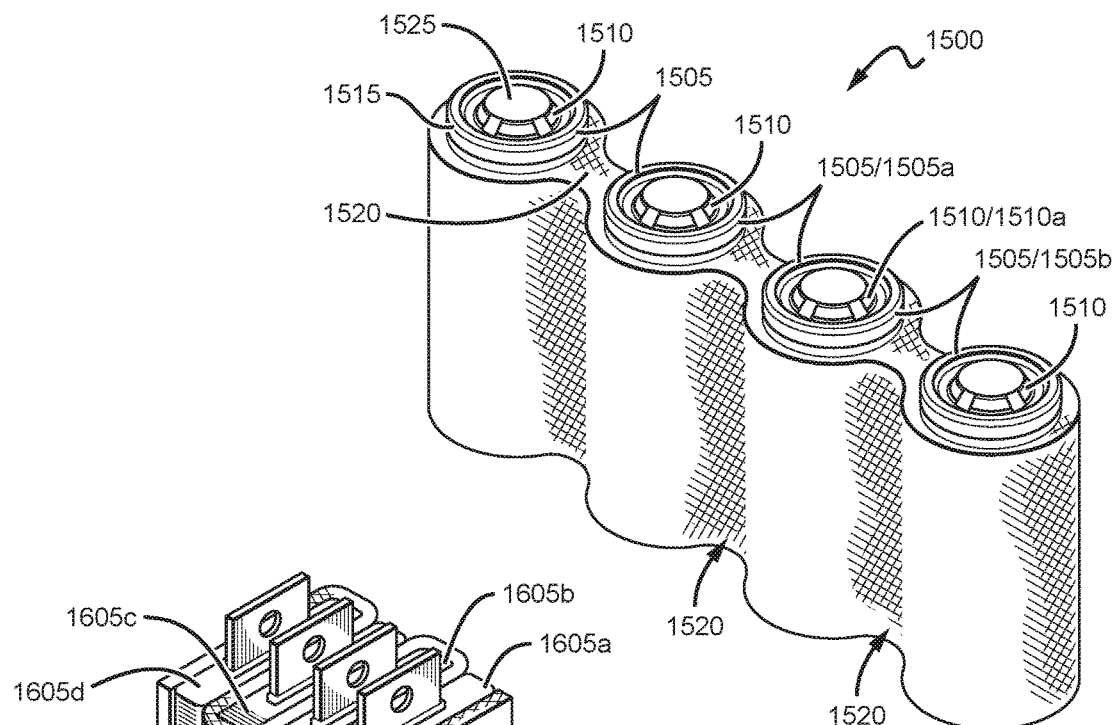
FIG. 15 illustrates another embodiment of a common wicking structure that is a series of wicking jackets in liquid communication with one another to establish a wicking ground plane.

FIG. 15 illustrates another embodiment of a common wicking structure that is a series of wicking jackets in liquid communication with one another to establish a wicking ground plane. The common wicking structure 1500, in one embodiment a unitary body, has a plurality of wicking jackets 1505 in which are seated a respective plurality of cylindrical battery cells 1510. A cylindrical outer casing 1515 of each battery cell 1510 is cylindrically wrapped by its respective wicking jacket 1505. Adjacent wicking jacket 1505 are in liquid communication with each other through a narrowed portion 1520 of the common wicking structure 1500. In one embodiment, the common wicking structure 1500 may be formed of a woven structure that provides the dual roles of thermal management and failure containment. For example, if a middle battery cell 1510a begins to experience thermal run away, additional cooling liquid from adjacent wicking jackets (1505a, 1505b) may be automatically redirected as a result of passive capillary pumping action and/or capillary pull to the failing cell to help ensure that heat is dissipated into the cooling liquid, not the neighboring cell. The wicking jackets may also help to isolate the neighboring cells from overheating, thereby averting a cascading effect and preventing catastrophic failure. As described above for FIG. 2, the high tensile strength of the wicking jacket (woven ceramic jacket 200' in FIG. 2) may also provide supplemental structural reinforcement. The wicking jackets 1505 of the common wicking structure 1500 may be ceramic jackets or ceramic multiscale wicks or glass fibers or polymers or porous metallic foils.

Figure 16:
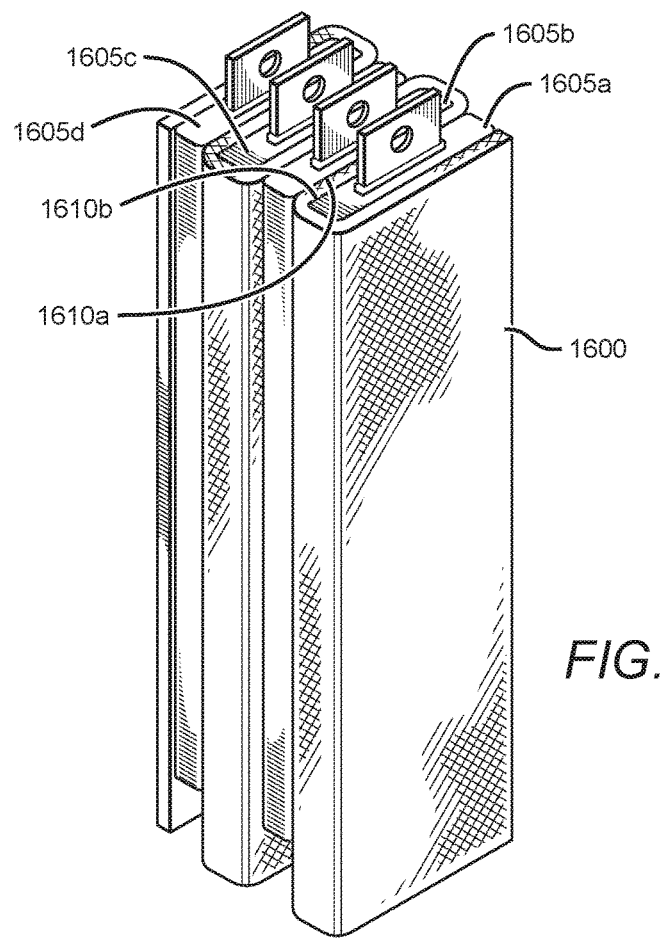
FIG. 16 illustrates another embodiment of a common capillary void matrix in the form of a single wrapped wick that is interwoven about a stacked plurality of rectangular battery cells to create individual wick sleeves for each cell.

FIG. 16 illustrates another embodiment of a common capillary void matrix in the form of a single wrapped wick that is interwoven about a stacked plurality of rectangular battery cells to create individual wick jackets for each cell. A single wrapped wick 1600 may be interwoven between and among adjacent battery cells (1605a, 1605b, 1605c, 1605d) so that adjacent lateral faces (1610a, 1610b) have a single layer of wick 1600 between them. Each battery cell (1605a, 1605b, 1605c, 1605d) may be substantially rectangular. Because the single wrapped wick 1600 is interwoven between the first, second, third, and fourth battery cells (1605a, 1605b, 1605c, 1605d), the single wrapped wick acts as a common wicking ground plane thereby creating parallel thermal paths for receipt of working fluid during operation.

Figure 17:
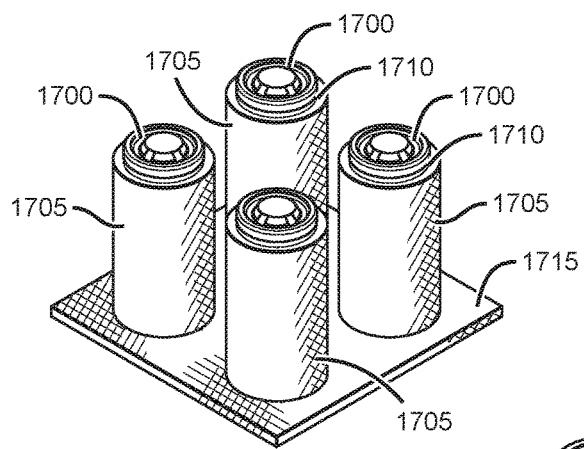
FIG. 17 illustrates one embodiment of a wicking ground plane that is a capillary void matrix to provide a plurality of parallel working liquid flow paths around each of the plurality of wicking jackets in a thermal management system.

FIG. 17 illustrates one embodiment of a wicking ground plane that is a capillary void matrix to provide a plurality of parallel working liquid flow paths around each of the plurality of wicking jackets in a thermal management system. A plurality of heat sources, such as battery cells 1700, may be seated in a respective plurality of wicking jackets 1705, with outer circumferential surfaces 1710 of each battery cell in thermal communication with its respective wicking jacket 1705. Each wicking jacket 1705 may be seated on a wicking ground plane 1715 that may be a capillary void matrix (referred to elsewhere herein as a "wick" or "thermal/material ground plane"), such as one or more layers of braided or knitted fibers or sintered thermally communicative particles. An interface between each wicking jacket 1705 and the wicking ground plane 1715 is such that capillary pumping action is enabled between them. In an alternative embodiment, the wicking ground plane 1715 and wicking jackets 1705 are not separate components of a final assembly, but rather are formed as a unitary structure during fabrication, such as would be possible if formed of sintered metallic particles using a mold defining all of the structures for sintering.

Figure 18:
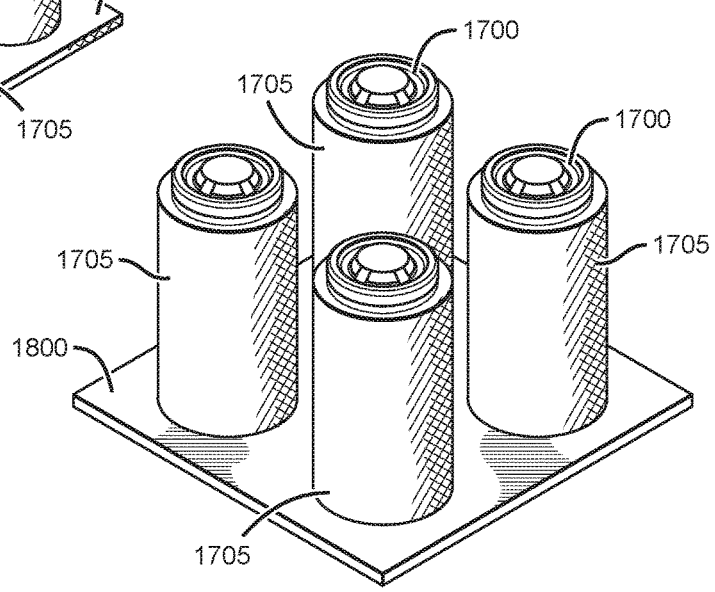
FIG. 18 illustrates one embodiment of a wicking ground plane in the form of a pool of working fluid that provides a plurality of parallel working liquid flow paths around each of the plurality of wicking jackets in a thermal management system.

FIG. 18 illustrates one embodiment of a wicking ground plane in the form of a pool of working fluid that provides a plurality of parallel working liquid flow paths around each of the plurality of wicking jackets in a thermal management system. In this embodiment, the battery cells 1700 first illustrated in FIG. 18 may be seated in respective wicking jackets 1705, with their respective outer circumferential surfaces 1710 in thermal communication with their respective wicking jacket 1705. Each of the wicking jackets may be seated in the pool of working fluid 1800 so that, as excess heat from the batteries 1700 causes a liquid-to-vapor phase change within a wicking jacket 1705, such lost liquid may be replaced using capillary pumping action by liquid drawn up from the pool of working fluid 1800 into the wicking jacket 1705 and towards the area of deficient working fluid in a passive system of working fluid replenishment. In each of the embodiments illustrated in FIGS. 17 and 18, the wicking jackets 1705 may be omitted or supplemented with microchannels formed in the outer surface of the outer casing (e.g., See FIG. 12)

Figure 19:
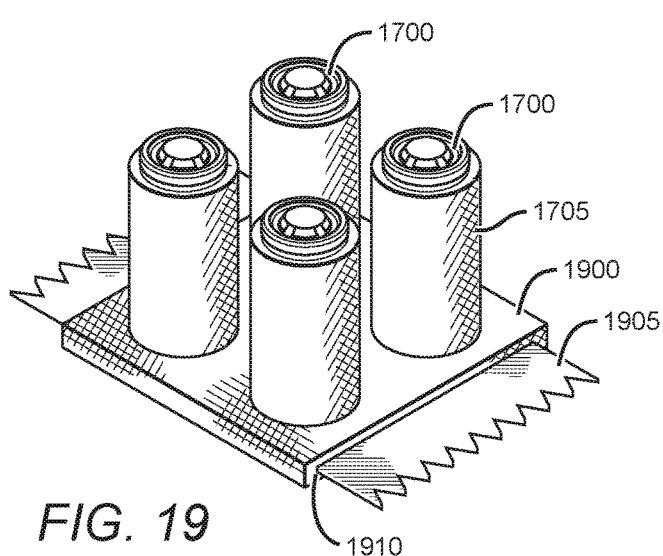
FIG. 19 illustrates one embodiment of an electrical bus bar extending through a wicking ground plane for electrical connection to battery cells.

FIG. 19 illustrates one embodiment of an electrical bus bar extending through a wicking ground plane for electrical connection to battery cells. The plurality of battery cells 1700 may be seated in a respective plurality of wicking jackets 1705, with outer circumferential surfaces 1710 of each battery cell in thermal communication with its respective wicking jacket 1705. In an alternative embodiment, the battery cells 1700 may be provided with a modified outer casing having a capillary void matrix formed in the outer casing (see FIGS. 12 and 13) and the wicking jacket may be omitted. Each wicking jacket 1705 may be seated on a wicking ground plane 1900, such as one or more layers of braided or knitted fibers or sintered thermally communicative particles that function as a capillary void matrix. The electrical bus bar 1905 may extend within an interior 1910 of the wicking ground plane 1900. Battery terminals (not shown) of the battery cells may be in electrical communication with electrical bus bar 1905 through the wicking ground plane 1900 such as through respective wicking ground plane orifices (not shown). An interface between each wicking jacket 1705 and the wicking ground plane 1900 is such that capillary pumping action is enabled as between them. In an alternative embodiment, the electrical bus bar 1905 is disposed beneath or adjacent to the wicking ground plane 1900, and electrical connection between the electrical bus bar 1905 and battery terminals may be provided through the wicking ground plane 1900.

Figure 20:
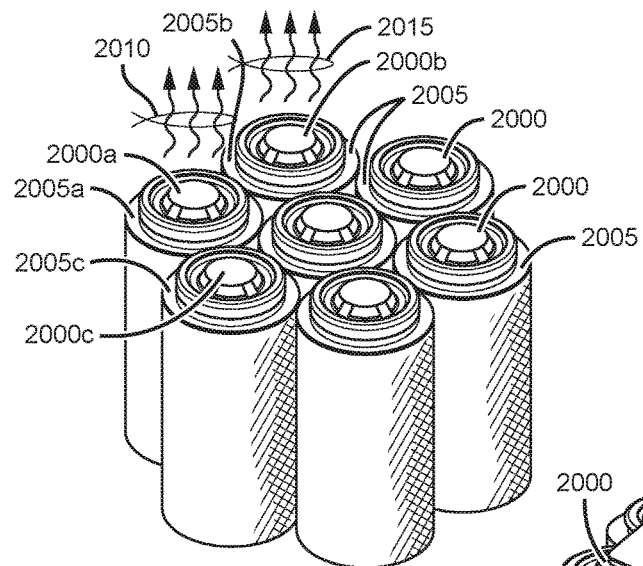
FIG. 20 is a perspective view illustrating formation of a wicking ground plane using direct physical contact between the wick structures of the neighboring cells for liquid communication between them.

FIG. 20 is a perspective view illustrating formation of a wicking ground plane that uses direct physical contact (point or line or surface) between the wick structures of the neighboring cells for communication of the working fluid between them. A plurality of heat sources such as batteries 2000 are encompassed by respective capillary void matrices that may be primary wicking jackets 2005. The primary wicking jackets may be formed from braided or knitted fibers or from a non-woven process. In other embodiments, a capillary void matrix is formed in the battery casing itself to receive the working fluid rather than being a separate jacket-like structure that receives the battery. Subsequent to charging with a dielectric working fluid, each primary wicking jacket 2005a functions to passively self-regulate the supply of working fluid to the adjacent wicking jacket 2005b. For example, if excess heat generated in battery cell 2000a produces more vapor 2010 from a liquid-to-vapor phase change process in wicking jacket 2005a than vapor 2015 produced in adjacent wicking jackets 2000b and 2000c, the wicking jacket 2005a would draw proportionally more liquid into battery cell 2000a from adjacent cells 2000b and 2000c from a balance of capillary pumping forces within the system. In this manner, "self-adapting cooling" is produced by a cell's own rate of heat generation. In the case of a thermal run away, additional cooling liquid from the neighboring cells' wicks is automatically redirected to what may be a failed cell helping to ensure that heat is dumped in the cooling liquid, not the neighboring cell.

In an alternative embodiment, the wicking ground plane 1900 and wicking jackets 1705 are not separate components of a final assembly, but rather are formed as a unitary structure during fabrication, such as would be possible if formed of sintered metallic particles using a mold defining all of the structures for sintering.

Figure 21A:
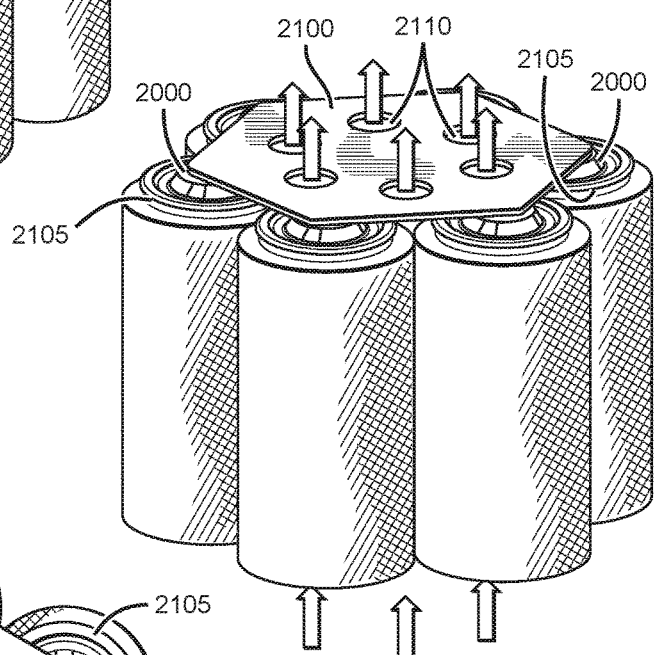
FIGS. 21A and 21B illustrate side perspective and top plan views of one embodiment of a plurality of heat sources, such as the batteries 2000 illustrated in FIG. 20, having a vent panel opposing the terminal ends of the batteries.
Figure 21B:
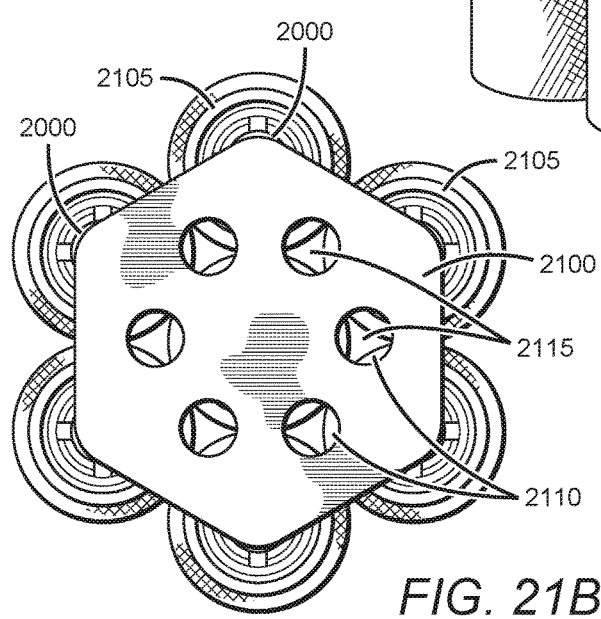

FIGS. 21A and 21B illustrate side perspective and top plan views of one embodiment of a plurality of heat sources, such as the batteries 2000 illustrated in FIG. 20, having a vent panel opposing the terminal ends of the batteries. In one embodiment, the vent panel is a top bus bar in the form of an electrically conductive plate to electrically connect the top battery terminals together. The top bus bar may be formed from a metallic plate or other electrically conductive plate. In another embodiment, the top bus bar is non-electrically conductive and has electrical traces configured to electrically couple together top terminals of each of the batteries. The top bus bar may have a plurality of circular vents to transport vapor, with an area of each vent either the area of a vapor channel disposed in complementary opposition to the vent and formed vertically between adjacent circular batteries. Although six vents are illustrated in FIGS. 21A and 21B, in an alternative environment, a plurality of vents may be provided in the top bus bar that may or may not be in complementary opposition to the vapor channels.

While various implementations of the application have been described, it will be apparent to those of ordinary skill in the art that many more embodiments and implementations are possible that are within the scope of this invention.

We claim:

1. An apparatus, comprising:
   a vapor-tight enclosure;
   a first battery cell having a first terminal end, a second terminal end, and a casing, wherein the casing comprises a plurality of micro-channels fabricated in an exterior surface thereof;
   a wicking ground plane in thermal and fluid communication with an inner surface of a first wall of the enclosure, wherein the wicking ground plane is in capillary force communication with the plurality of micro-channels;
   an electrical bus bar disposed solely within an interior of the vapor-tight enclosure extending through the wicking ground plane and in electrical communication with the second terminal end; and
   an interior wick structure disposed on and in thermal communication with an interior surface of a second wall of the enclosure, wherein the interior wick structure is in capillary force communication with the wicking ground plane.

2. The apparatus of claim 1, wherein the plurality of micro-channels comprise parallel micro-channels extending longitudinally between the first terminal end and the second terminal end.

3. The apparatus of claim 1, wherein the plurality of micro-channels comprises a lattice of micro-channels.

4. The apparatus of claim 1, further comprising:
   a second battery cell comprising a first terminal end, a second terminal end, and a casing, wherein the casing comprises a plurality of micro-channels fabricated in an exterior surface thereof;
   wherein the plurality of micro-channels fabricated in the exterior surface of the second battery cell are in thermal and liquid communication with the plurality of micro-channels fabricated in the exterior surface of the first battery cell via the wicking ground plane.

5. The apparatus of claim 4, further comprising:
   a vent panel opposing the first terminal end of the first battery cell and the first terminal end of the second battery cell, the vent panel comprising a plurality of vents configured to permit a diffusion of a vapor between a first side of the vent panel and a second side of the vent panel.

6. The apparatus of claim 5, wherein the vent panel is an electrical bus bar in electrical communication with the first terminal end of the first battery cell and the first terminal end of the second battery cell.

7. The apparatus of claim 1, wherein the plurality of micro-channels are fabricated circumferentially about the exterior surface of the battery cell casing.

8. The apparatus of claim 1, wherein the plurality of micro-channels fabricated in the battery cell exterior surface comprises die-cast micro-channels or machined micro-channels.

* * * * *